Oct. 7, 1958 — E. M. IRWIN ET AL — 2,855,564
MAGNETIC TESTING APPARATUS AND METHOD
Filed Oct. 14, 1955 — 2 Sheets-Sheet 1

EMMETT M. IRWIN
WILLIAM W. IRWIN
INVENTORS

BY
ATTORNEY

EMMETT M. IRWIN
WILLIAM W. IRWIN
INVENTORS

United States Patent Office 2,855,564
Patented Oct. 7, 1958

2,855,564

MAGNETIC TESTING APPARATUS AND METHOD

Emmett M. Irwin, San Marino, and William W. Irwin, Montebello, Calif., said William W. Irwin assignor to said Emmett M. Irwin Application October 14, 1955, Serial No. 540,430

8 Claims. (Cl. 324—37)

This invention relates to an apparatus and method for testing specimens of magnetic material for the purpose of determining the location and extent of flaws, weak spots, structural changes, etc. The present method and apparatus constitutes an improvement over those described in United States Patent No. 2,555,853, issued June 5, 1951, to Emmett M. Irwin for a Magnetic Testing Apparatus and Method.

The function of a magnetic testing apparatus is to determine, with accuracy and reliability, the extent and severity of flaws and structural changes in magnetic elements such as the sucker rods and drill pipe employed in the oil industry. Thus, in order to tell with accuracy whether or not a particular piece of new or used sucker rod or drill pipe is suitable for use in an oil well, it must be known not only where the flaw is but also how severe it is from a standpoint of weakening. In addition, the testing means must be able to indicate the metallurgical structure of the magnetic element being tested, since structural changes resulting from fatigue, heat treatment, etc., also determine the ability of the specimen to withstand the stresses encountered in service.

The method and apparatus described and claimed in the above-cited patent constituted a great advance over prior art devices and methods in that structural changes as well as flaws were indicated, and in that a relatively narrow band width was achieved. However, the method and apparatus described in the cited patent were deficient in that narrow defects having a length of less than the band width were not indicated to the same degree as larger defects having a length greater than the band width. It is to be understood that the indicated band width, that is to say the distance or space within which a small flaw in a specimen passing through a test device will produce a reading on the indicator of such device, tends to be large in oil equipment testing operations due to the fact that the test device must have a much larger diameter than that of the main body of the sucker rod or drill pipe being tested. This is because the joints or couplings between connecting lengths of sucker rod or drill pipe are of substantially larger diameter than the main bodies of the rod or pipe, so that the internal diameter of the test device must be made relatively large in order that the joints may pass therethrough during testing.

Relative to the determination of structural changes, as distinguished from flaws and cracks, it is to be understood that an entire length of rod or pipe may be uniformly fatigued or otherwise unsatisfactory. If the instrument does not detect such a uniform condition, an unsatisfactory length of rod or pipe may be certified as satisfactory for use in the well, with consequent great loss when the length breaks due to its advanced stage of fatigue.

In view of the above factors characteristic of methods and apparatus for testing magnetic materials such as lengths of sucker rod and drill pipe, it is an object of the present invention to provide an improved testing method and apparatus adapted to indicate small defects, as well as large ones, in their true degree of severity.

An additional object is to provide a method and apparatus for greatly increasing the indication or response effected by flows and the like, and for showing all types and shapes of flaws and defects in their true degree of severity.

A further object is to provide an improved magnetic testing apparatus capable of determining the presence and severity of cracks and other flows, and also capable of determining when a length of specimen is uniformly fatigued or otherwise defective.

These and other objects and advantages of the invention will be more fully set forth in the following specification and claims considered in connection with the attached drawings to which they relate.

Figure 1:
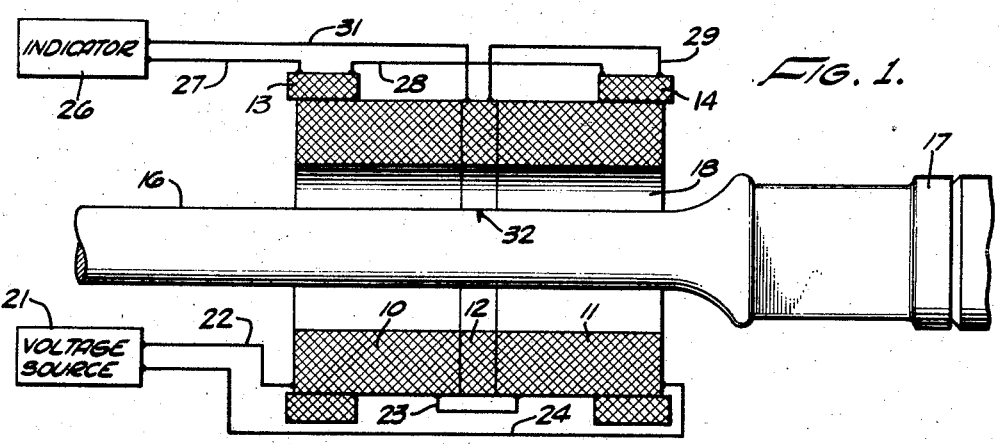
Figure 1 is a schematic representation of a magnetic test device constructed in accordance with the present invention, and showing a length of sucker rod being passed through the test device.

Referring now to Figure 1 of the drawing, the magnetic testing apparatus of the invention is illustrated as comprising a pair of primary coils 10 and 11, and three secondary coils 12–14. A test specimen, in the form of a length of sucker rod 16, is shown as passing along the common axis of coils 10–14 all of which are of the annular or "ring" type. A joint or coupling 17 is illustrated at one end of sucker rod 16, and has an outer diameter only slightly less than the inner diameters of coils 10–12, it being understood that such inner coil diameters are desirably the minimum which will permit passage of the joints.

The primary coils 10 and 11 may be of any suitable type, but preferably correspond to each other and are disposed on opposite sides of the secondary coil 12, which will be referred to as the central, inner coil. As above indicated, the central inner coil 12 preferably has the same inner diameter as that of the primary coils 10 and 11 between which it is located, but the outer diameter of coil 12 may or may not be the same as the outer diameters of coils 10 and 11.

Secondary coils 13 and 14, which may be referred to, respectively, as the "outer left" and "outer right" coils, correspond to each other and are disposed equal distances on opposite sides of the central radial plane of coil 12. The diameters and shapes of coils 13 and 14, the locations thereof, and the numbers of turns therein as compared to the central inner coil 12, are important to the invention and will be discussed hereinafter. It is to be understood that the coils 10–14 are associated with suitable non-magnetic support and mounting means, not shown, which hold them in rigidly mounted positions relative to each other and to the sucker rod 16. It is also to be understood that means, not shown, are provided for passing the sucker rod 16 axially through the cylindrical opening or passage 18 through coils 10–12. The sucker rod is thus passed through what will be termed the "test zone," i. e. the space encompassed by the various coils as well as end spaces at each end of the test device.

The primary coils 10 and 11 are additively connected to each other and are energized by a suitable source of cyclically-varying voltage, indicated at 21. Conveniently, voltage source 21 may be a source of alternating current at commercial frequency. The energizing circuit for coils 10 and 11 may be traced from one terminal of source 21 through a lead 22 to one side of coil 10, thence from the other side of coil 10 through a lead 23 to one side of coil 11, and thence from the other side of coil 11 through a return lead 24 to the remaining terminal of source 21.

The outer secondary coils 13 and 14 are connected additively relative to each other, but in opposition to the inner secondary coil 12. Thus, the combined voltage induced in secondaries 13 and 14 is subtracted from the voltage induced into secondary 12, and the difference is read by a suitable indicator shown schematically at 26. Indicator 26 is preferably of the pen recorder-galvanometer type shown and described in United States Patent 2,673,613, issued March 30, 1954, to Emmett M. Irwin for an Apparatus and Method for Fatigue Determinations. The circuit between the secondary coils and indicator 26 may be traced from one terminal of the indicator (that is to say one side of coil "S" in the cited patent) through a lead 27 to the left side of outer coil 13, thence from the right side of outer coil 13 through a lead 28 to the left side of outer coil 14, thence from the right side of outer coil 14 through a lead 29 to the right side of inner coil 12, and finally from the left side of inner coil 12 through a lead 31 to the remaining terminal (the other side of coil "S" in the cited patent) of the indicator.

Figure 2:
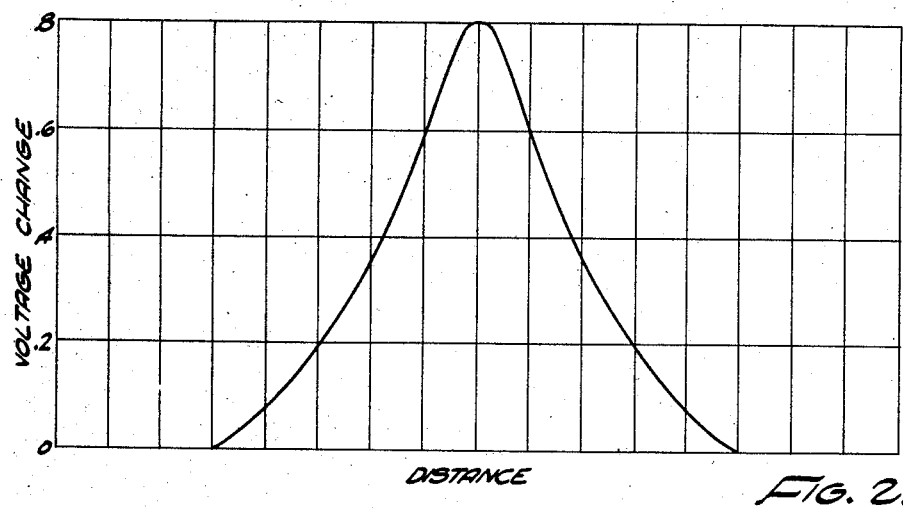
Figure 2 is a graphical representation of the voltage induced into the central, inner secondary coil as the result of passage of a crack or defect through the test instrument.

Referring particularly to Figure 2, the voltage change across the inner secondary coil 12 is shown as plotted against distance, the distance scale being the same as that employed for the showing of Figure 1. It is to be understood that when a crack or other flaw in sucker rod 16, for example the crack shown at 32, passes through passage 18, the flux pattern generated by primary coils 10 and 11 will be altered in such manner as to increase the resultant voltage across the secondary coils. Thus, when flaw 32 is exactly at the center of the test instrument, the voltage change across inner secondary 12 may be 0.8 volts, for example, but when the flaw 32 is one distance unit to the left or right of center then the voltage change across secondary 12 will be only 0.6 volts as shown in Figure 2. "Voltage change" is the difference in reading from the reading obtained on a standard perfect rod. It is pointed out that the band width of the voltage curve shown in Figure 2 is relatively wide, for example, ten distance units as illustrated.

Figure 3:
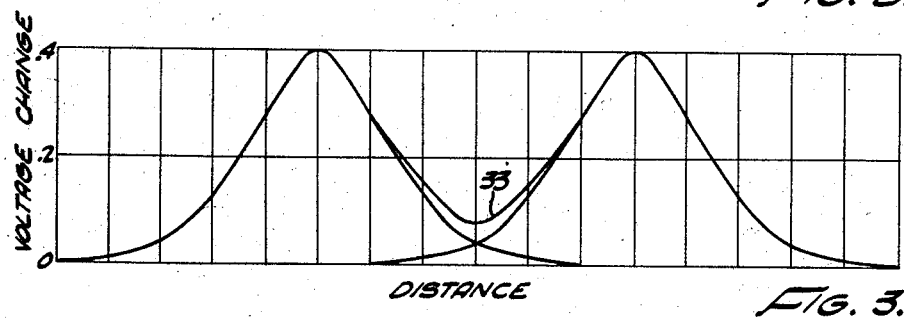
Figure 3 is a graphical representation of the voltage induced into the two outer secondary coils due to passage of the crack through the instrument.

Proceeding next to Figure 3, voltage curves corresponding to the ones shown in Figure 2 are shown as plotted for the outer secondary coils 13 and 14. These curves have much the same shape as the one shown in Figure 2, but have considerably lower maximum values due to the greater diameters of coils 13 and 14 and due to the fact that the number of turns in each outer secondary 13 or 14 is much less than the number of turns in inner secondary 12. The upper curve, designated 33, shown in Figure 3 represents the sum of the curves for the individual coils 13 and 14. Curve 33 is coincident with the curves for the individual coils except at the points where such curves overlap, i. e. at the center of the instrument.

Figure 4:
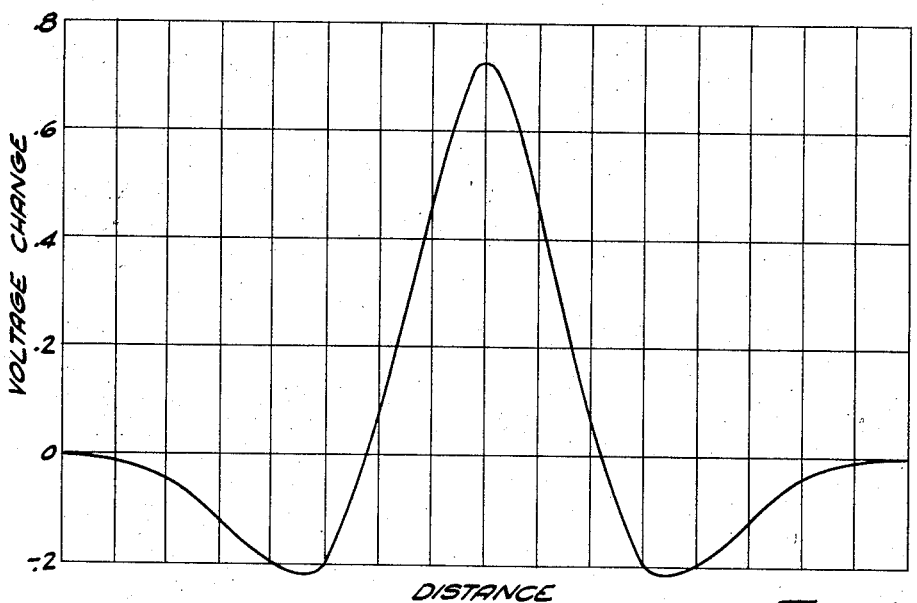
Figure 4 is a graphical representation of the resultant voltage curve created by subtracting the voltage curves of Figure 3 from the curve of Figure 2.

There is illustrated in Figure 4 the voltage curve actually read by indicator 26, that is to say the resultant curve formed by subtracting from the curve of Figure 2 (the voltage across inner secondary 12) the voltage curve 33 representing the sum of the voltages across coils 13 and 14. The curve of Figure 4 may have a peak value of over 0.7 volts, or approximately 90 percent of the 0.8 volt peak value present in the secondary 12 alone. However, instead of having a band width of ten distance units as is the case with secondary 12, the resultant voltage shown in Figure 4 has a band width of less than five distance units. It is pointed out that parts of the resultant curve of Figure 4 drop below the zero voltage axis and are therefore negative. These parts may be referred to as "negative dip," and serve the purpose of accentuating the presence of the positive peak of the curve.

The number of turns in outer coils 13 and 14, the shapes and diameters of such coils, and the axial distance therebetween vary somewhat in accordance with the types and shapes of magnetic specimens to be tested. Stated generally, however, it has been discovered that the axial distance between outer coils 13 and 14 should be about the same as the diameter of each coil 13 and 14. When the axial distance between the coils 13 and 14 is made much less than the diameter thereof, the coils 13 and 14 begin acting like a single outer secondary coil as described in the cited Patent 2,555,853. On the other hand, where the axial distance between coils 13 and 14 is substantially more than the diameter of the coils 13 and 14, then the amount of negative dip is undesirably great.

The diameters of coils 13 and 14 should be greater, instead of less, than that of coil 12, in order to prevent excessive negative dip from resulting and in order to show level changes.

A preferred method of determining the locations, shapes and diameters of outer secondary coils 13 and 14, as well as the number of turns in all of the secondary coils 12–14, is to make a transverse saw cut in a sucker rod or other specimen which is otherwise perfectly sound and unfatigued. The specimen is then moved through the test device, and curves are plotted as shown in Figures 2 and 3. This process is then repeated, with various sizes, spacings, etc., of the secondary coils, until the resulting curves are such as to produce a desired resultant curve such as the one shown in Figure 4.

It has been discovered that in order to achieve a desired resultant curve such as the one shown in Figure 4, the outer secondaries 13 and 14 should each have a greater axial dimension, by a factor of about two, than the inner secondary 12. This causes the voltage curves for the outer secondaries to be relatively flat. Thus, the outer secondaries 13 and 14 may each be on the order of one inch in axial dimension, whereas the inner secondary 12 may be on the order of ⅜ or ½ inch.

The method of testing specimens for flaws and structural changes is as follows: a calibration specimen, of known characteristic is first inserted into the test device and a null balance is achieved as set forth in the cited patent, No. 2,673,613. Thereafter, the calibration specimen is removed and a continuous length of sucker rod, drill pipe, etc., is passed through the test device, also as described in Patent 2,673,613.

During the testing operation severe flaws will show up as large peaks on the continuous voltage curve indicated by the pen recorder portions of the galvanometers (indicator 26). These peaks will be readily distinguishable from the several small peaks caused by closely spaced inconsequential flaws, this being because of the strong response or indication achieved with the present instrument, and the fact that all flaws are indicated in their true degree of severity.

In the event that a uniformly fatigued specimen is passed through the test device, this will be indicated by a change in the elevation of the voltage curve, that is to say, the curve will no longer lie along the horizontal or zero axis in the absence of a flaw or defect. The reason for this shift in elevation of the curve when a uniformly bad specimen is passed through the test instrument is that the outer secondary coils 13 and 14 have a larger diameter than inner secondary 12. If all of the secondaries 12-14 had the same diameter, the indicator 26 would read the same for a uniformly fatigued or otherwise defective specimen as for a satisfactory specimen. However, with the present instrument, a uniformly fatigued or otherwise defective specimen does not produce the same reading, but instead produces the indicated shift in horizontal axis and so may be detected by the operator and discarded.

To amplify upon the preceding paragraph, it is to be understood that the voltage generated in inner secondary 12 is equal to a constant times the flux encompassed by coil 12. If the outer secondaries 13 and 14 had the same diameter as that of coil 12, the voltage induced therein would also be equal to a constant times the flux encompassed by coil 12. In such a situation, and with the voltage in coil 12 balanced against that in coils 13 and 14 as previously described, the type of specimen, or in fact the complete absence of a specimen, will not affect the balance at all, and this means that the horizontal axis will not be shifted for a uniformly defective specimen.

With the present device, on the other hand, the voltage induced in coils 13 and 14 equals a constant times the flux encompassed by coil 12 plus the same constant times the flux contained in the annular space surrounding coil 12 but within the coils 13 and 14 which are of larger diameter. This last amount of flux will be varied in accordance with the characteristics of the specimen within the test device, and certainly in accordance with the presence or absence of any specimen. Accordingly, when the voltage in coil 12 is balanced against that in coils 13 and 14 for a calibrating or perfect specimen, any change in the specimen, for example the change which takes place when a specimen is uniformly fatigued or otherwise defective, will operate to change the amount of flux in the annular space outwardly of coil 12 and inwardly of coils 13 and 14. Any deviation of the specimen 15 from a perfect unfatigued specimen will therefore be readily detected by the instrument because of a shift in the horizontal axis.

It is to be understood that the use of encircling "ring" coils as taught herein operates to eliminate any errors created by shifting of the specimen 16 away from the axis of the test instrument. For example, if the specimen 16 is shifted somewhat above the position shown in Figure 1, the voltage induced into the surrounding secondary coils will nevertheless be substantially the same because, although more flux will link the upper portions of the coils, this will be compensated by the fact that less flux will link with the lower portions of the secondaries. This is to be contrasted with situations in which there are no encircling coils, but instead small coils disposed on one side of the test specimen. With the latter type of device, any shifting of the specimen away from a predetermined path will result in a very large error in the reading.

Figure 5:
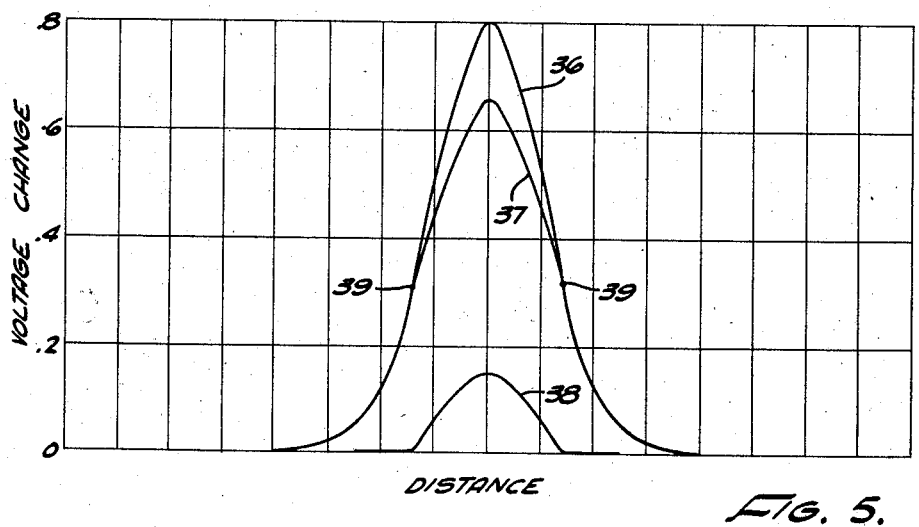
Figure 5 is a graphical representation of voltages induced in the coils described in the above-cited patent, it being understood that the horizontal or distance scale is not necessarily the same as that employed in the curves of Figures 2–4.

The improvement of the present invention can best be understood by making a comparison of the voltage curves shown in Figures 2-4 with the voltage curves shown in Figure 5 and produced with the apparatus described in Patent 2,555,853. In Figure 5 the number 36 represents the voltage induced in the inner secondary coil, the number 37 represents the voltage induced in the outer secondary coil, and the number 38 represents the resultant voltage curve produced by bucking curves 36 and 37 against each other.

It will be noted that curves 36 and 37 are approximately coincident until points 39 are reached, but that between points 39 the change in voltage in the inner coil is greater due to its proximity to the test specimen. It will also be noted that resultant curve 38 has a lesser band width than curves 36 and 37, as described but that it also has a very much lesser amplitude.

Figure 8:
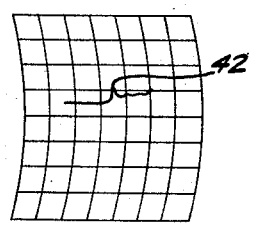
Figures 8 and 9 correspond, respectively, to Figures 6 and 7 but show readings for a different specimen.
Figure 9:
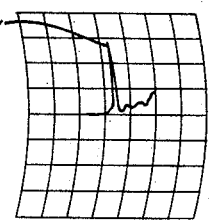
Figure 6:
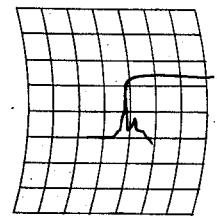
Figure 6 shows an actual test reading taken with the apparatus described in the cited patent.
Figure 7:
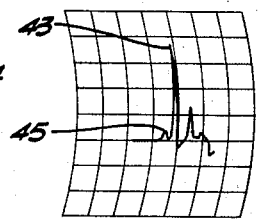
Figure 7 shows an actual test reading of the same specimen as is represented in Figure 6, taken with an apparatus constructed in accordance with the present invention and having the same sensitivity as the apparatus employed to take the reading of Figure 6.

With the apparatus of the present invention, on the other hand, the resultant curve shown in Figure 4 has almost as great an amplitude as the curve for inner secondary 12 and shown in Figure 2, in addition to having a desired narrow band with. Accordingly, peak 41 shown in Figure 9 is very much higher than the corresponding peak 42 of Figure 8, the latter being made with the apparatus of Patent 2,555,853 and the former with the present apparatus. Also, peak 43 in Figure 7 is much higher than corresponding peak 44 in Figure 6.

The increased response produced with the present instrument is important in the overcoming of pen recorder friction and inertia and thus in showing up flaws which might otherwise go undetected. For example, flaw 45 shown in Figure 7 is hardly registered in Figure 6.

While the particular method and apparatus herein shown and disclosed in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

We claim:

1. In a magnetic testing apparatus for subjecting successive portions of a member in a test zone to inspection for magnetic disconformities, means for creating a cyclically varying magnetic flux in said test zone and in said member therein, the flux pattern in said test zone changing with the magnetic properties of different portions of said member, a first coil encompassing said test zone, second and third coils encompassing said test zone and axially spaced on opposite sides of said first coil, said second and third coils having diameters substantially different than that of said first coil, and circuit means to connect said second and third coils additively and in opposition to said first coil so that the sum of the voltages induced in said second and third coils by said cyclically varying flux will buck against the voltage induced in said first coil thereby and will produce a resultant voltage.

2. A magnetic testing apparatus for subjecting successive portions of a member in a test zone to inspection for magnetic disconformities, comprising means for creating a cyclically varying magnetic flux in said test zone and in said member therein, the flux pattern in said test zone changing with the magnetic properties of different portions of said member, a first coil encompassing said test zone, second and third coils encompassing said test zone and axially spaced on opposite sides of said first coil, at least one of said second and third coils having a diameter substantially different than that of said first coil, circuit means to connect said second and third coils additively and in opposition to said first coil so that the sum of the voltages induced in said second and third coils by said cyclically varying flux will buck against the voltage induced in said first coil thereby and will produce a resultant voltage, and indicator means to provide a reading of said resultant voltage.

3. In a magnetic testing apparatus for inspecting successive portions of a member in a test zone, means for creating a cyclically varying magnetic flux in said test zone and in said member therein, the flux pattern in said test zone changing with the magnetic properties of different portions of said member, a first coil encompassing said test zone, second and third coils encompassing said test zone and axially spaced on opposite sides of said first coil, said second and third coils corresponding to each other and having diameters substantially larger than that of said first coil, and circuit means to connect said second and third coils additively and in opposition to said first coil so that the sum of the voltages induced in said second and third coils by said cyclically varying flux will buck against the voltage induced in said first coil thereby and will produce a resultant voltage.

4. The invention as claimed in claim 3, in which said second and third coils are spaced equal distances on opposite sides of said first coil, and in which the spacing between said second and third coils is substantially the same as the diameter of either of said second and third coils.

5. A magnetic testing instrument, which comprises a pair of corresponding annular primary coils, said primary coils being coaxial and axially spaced from each other, an annular inner secondary coil mounted between said primary coils and coaxial therewith, a pair of corresponding annular outer secondary coils coaxial with said above-named coils and spaced equal distances on opposite sides of inner secondary coil, said outer secondary coils having diameters substantially larger than that of said inner secondary coil, first circuit means to connect said primary coils in additive relationship, second circuit means to connect said outer secondary coils in additive relationship relative to each other but in opposing relationship relative to said inner secondary coil, means to supply a cyclically varying voltage to said first circuit means, and indicator means connected to said second circuit means to indicate the resultant voltage induced in said secondary coils by said primary coils.

6. The invention as claimed in claim 5, in which said outer secondary coils have diameters substantially equal to the axial distance between said outer secondary coils.

7. The invention as claimed in claim 5, in which said outer secondary coils each have an axial dimension approximately twice as great as the axial dimension of said inner secondary coil.

8. A magnetic testing apparatus for testing a member in a test zone, which comprises means for creating a cyclically varying magnetic flux in said test zone in said member extending axially within the test zone, inner secondary coil means in which a progressively changing voltage is induced when a small flaw in said member is moved axially through said test zone, the induced voltage reaching a maximum when said flaw is centered opposite said inner secondary coil means and having side portions when said flaw is disposed on either side of center, outer secondary coil means positioned on either side of said inner secondary coil means and in which a voltage is induced having two maximums on either side of said inner secondary coil means and a minimum opposite said inner secondary coil means, and circuit means for connecting said inner and outer secondary coil means in opopsition to each other so that the resultant voltage is characterized by suppressed side voltages and by only a small decrease in said maximum induced in said inner secondary coil means.

References Cited in the file of this patent

UNITED STATES PATENTS

| | | |
|---|---|---|
| 2,215,605 | DeLanty | Sept. 24, 1940 |
| 2,540,588 | Long | Feb. 6, 1951 |
| 2,680,226 | Whitehead et al. | June 1, 1954 |